(12) United States Patent
Moyer (10) Patent No.: US 8,572,147 B2
(45) Date of Patent: Oct. 29, 2013

(54) METHOD FOR IMPLEMENTING A BIT-REVERSED INCREMENT IN A DATA PROCESSING SYSTEM

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1274 days.

(21) Appl. No.: 12/164,444

(22) Filed: Jun. 30, 2008

(65) Prior Publication Data

US 2009/0327332 A1  Dec. 31, 2009

(51) Int. Cl.
    *G06F 17/14* (2006.01)
(52) U.S. Cl.
    USPC ........................................................ 708/404
(58) Field of Classification Search
    USPC .......................................... 708/404, 406, 409
    See application file for complete search history.

(56) References Cited

U.S. PATENT DOCUMENTS

| | | | | |
|---|---|---|---|---|
| 4,181,976 A | * | 1/1980 | Collins et al. | 708/404 |
| 5,012,441 A | | 4/1991 | Retter | |
| 5,430,667 A | * | 7/1995 | Takano | 708/404 |
| 5,752,275 A | * | 5/1998 | Hammond | 711/207 |
| 6,247,034 B1 | * | 6/2001 | Nakai et al. | 708/409 |
| 6,351,758 B1 | * | 2/2002 | Courtney et al. | 708/404 |
| 6,549,998 B1 | | 4/2003 | Pekarich et al. | |
| 7,275,148 B2 | | 9/2007 | Moyer et al. | |
| 2005/0068959 A1 | | 3/2005 | Taunton et al. | |

OTHER PUBLICATIONS

EREF: A Reference for Motorola Book E and the e500 Core, Motorola, Jan. 2004; pp. front, 8-34 and 8-298.*
PowerPC e500 Core Family Refenrence Manual, Freescale, Apr. 2005. pages: front and 1-2.*
EREF: A Reference for Freescale Book E and the e500 Core; Jan. 2004; Cover Page, Information Page and p. 382 (brinc); Freescale Semiconductor, Inc.
M68000PM/AD Programmer's Reference Manual Rev 1; 1992; Cover Pages, Table of Contents, and pp. 4-4 through 4-6; 1-14 through1-15, and 1-25 through 1-29; Motorola, Inc.

* cited by examiner

*Primary Examiner* — Chuong D Ngo
(74) *Attorney, Agent, or Firm* — Joanna G. Chiu (57) ABSTRACT

In a data processing system, a first instruction is received at an input of a processor. A specifier indicates both a first portion of a value and a second portion of the value. The first portion of the value is identified to be modified by the processor and the second portion of the value is identified to remain unchanged. The first instruction is decoded, and in response the processor modifies the first portion of the value by performing a bit-reversed increment to form a modified first portion. The modified first portion is combined with the second portion of the value which remained unchanged to form a first address. The first address is stored in first storage circuitry. A second instruction is decoded and in response the processor accesses data located at the first address which is assigned to a second storage circuit.

24 Claims, 5 Drawing Sheets

```
MASK (FROM FIG. 4) = 0000000E
~MASK = FFFFFFF1
ADDRESS OF FIRST ELEMENT OF BIT REVERSED ORDER,
            ELEMENT 0: rA = DCAABCF0 a = rA [16:31] = BCF0
         b = (a | ~MASK) = FFFFFFF1
         c = bitrev (b) = 8FFFFFFF
                   1+c = 9FFFFFFF
         d = bitrev (1+c) = FFFFFFF9
         e = d & MASK = 00000008
         f = rA & ~MASK = DCAABCF0
        rD = e | f = DCAABCF8
                        ↑       ↑
                    REMAINED   RESULTING
                    UNCHANGED  BIT-REVERSED
                               INCREMENT
```

| NUMBER OF DATA SAMPLES | DATA SIZE | | | |
|---|---|---|---|---|
| | BYTE | HALFWORD | WORD | DOUBLE WORD |
| 8 | 000...00000111 | 000...00001110 | 000...000011100 | 000...0000111000 |
| 16 | 000...00001111 | 000...00011110 | 000...000111100 | 000...0001111000 |
| 32 | 000...00011111 | 000...00111110 | 000...001111100 | 000...0011111000 |
| 64 | 000...00111111 | 000...01111110 | 000...011111100 | 000...0111111000 |

MASK (FROM FIG. 4) = 0000000E
~MASK = FFFFFFF1
ADDRESS OF FIRST ELEMENT OF BIT REVERSED ORDER,
ELEMENT 0: rA = DCAABCF0 a = rA [16:31] = BCF0
b = (a | ~MASK) = FFFFFFF1
c = bitrev (b) = 8FFFFFFF
1+c = 9FFFFFFF
d = bitrev (1+c) = FFFFFFF9
e = d & MASK = 00000008
f = rA & ~MASK = DCAABCF0
rD = e | f = DCAABCF8
          REMAINED    RESULTING
          UNCHANGED   BIT-REVERSED
                      INCREMENT

*FIG. 7*

ADDRESS OF SECOND ELEMENT OF BIT REVERSED ORDER,
ELEMENT 4: rA = DCAABCF8 a = rA [16:31] = BCF8
b = (a | ~MASK) = FFFFFFF9
c = bitrev (b) = 9FFFFFFF
1+c = AFFFFFFF
d = bitrev (1+c) = FFFFFFF5
e = d & MASK = 00000004
f = rA & ~MASK = DCAABCF0
rD = e | f = DCAABCF4
          REMAINED    RESULTING
          UNCHANGED   BIT-REVERSED
                      INCREMENT

*FIG. 8*

MASK (FROM FIG. 4) = 000E
~MASK = FFF1
DCAABCF0
a ← BCF0
b = (a | ~MASK) = FFF1
c = bitrev (b) = 8FFF
1+c = 9FFF
d = bitrev (1+c) = FFF9
e = d & MASK = 0008
rD = rA [0:15] || e
  = DCAA0008

*FIG. 9*
—PRIOR ART—

METHOD FOR IMPLEMENTING A BIT-REVERSED INCREMENT IN A DATA PROCESSING SYSTEM

BACKGROUND

1. Field

This disclosure relates generally to addressing in a data processing system, and more specifically, to a method for implementing bit-reversed addressing in a data processing system.

2. Related Art

Many types of filtering algorithms, such as in digital signal processing (DSP) applications, utilize buffers to hold sets of input samples and computed output samples from a set of filtering operations, such as Fast Fourier Transform (FFT) filters. These filters are typically accessed in a bit-reversed fashion to obtain the data and store outputs in a predetermined order which corresponds to the natural order of computations. For example, for an 8 element FFT buffer having elements 0, 1, 2, 3, 4, 5, 6, and 7 stored in a linear order, the bit-reversed order in which they need to be accessed is elements 0, 4, 2, 6, 1, 5, 3, and 7.

A bit reversed increment (brinc) instruction available today to support accessing FFT data in a bit-reversed manner provides, as its result, an index that is updated with bit-reversed addressing. The brinc instruction may have a format of "brinc rD, rA, rB" where rA contains the index into a buffer that contains data on which FFT is to be performed, rB contains a mask that allows the index to be updated with bit-reversed incrementing, and rD stores the resulting updated index with bit-reversed increment. This brinc instruction typically precedes a load with index instruction (e.g. lhax) which uses the resulting index to perform a load of the FFT data. However, a load with index instruction requires the use of three general purpose registers (GPRs). For example, this load instruction typically takes the form of "lhax rD, rA, rB" where rA contains a base address, rB contains an index value, and rD receives the data loaded from the address location addressed by "the base address+the index value". Therefore, the result of the brinc instruction can then be used as the index value of a subsequent load with index instruction to obtain the next FFT data element in the proper bit-reversed order. However, in many cases, the use of FFT filters appears in sections of code which rely heavily on the use of numerous GPRs, where the use of such load with index instructions necessary to load the FFT data may reduce efficiency of accessing FFT data.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, a bit-reversed modulo increment instruction (e.g. a brminc instruction) supports efficient bit-reversed incrementing. In one embodiment, the brminc instruction allows for a higher order portion of an initial address value to remain unchanged while allowing a lower order portion of the initial address to be updated or modified with a bit-reversed increment. In this manner, the resulting address value of the brminc instruction provides the actual address value of a next buffer element in memory to be accessed according to a bit-reversed sequencing. This resulting address value allows for a subsequent load without index type load instruction to be used to access the buffer element stored at the resulting address. This type of load instruction, as compared to a load with index type load instruction, requires the use of less GPRs which may allow for more efficient operation.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [0:7]" or "conductors [0:7] of bus 60" indicates the eight higher order conductors of bus 60, and "address bits [0:7]" or "ADDRESS [0:7]" indicates the eight higher order bits of an address value. The symbol "$" or "0x" preceding a number indicates that the number is represented in its hexadecimal or base sixteen form. The symbol "%" preceding a number indicates that the number is represented in its binary or base two form.

Figure 1:
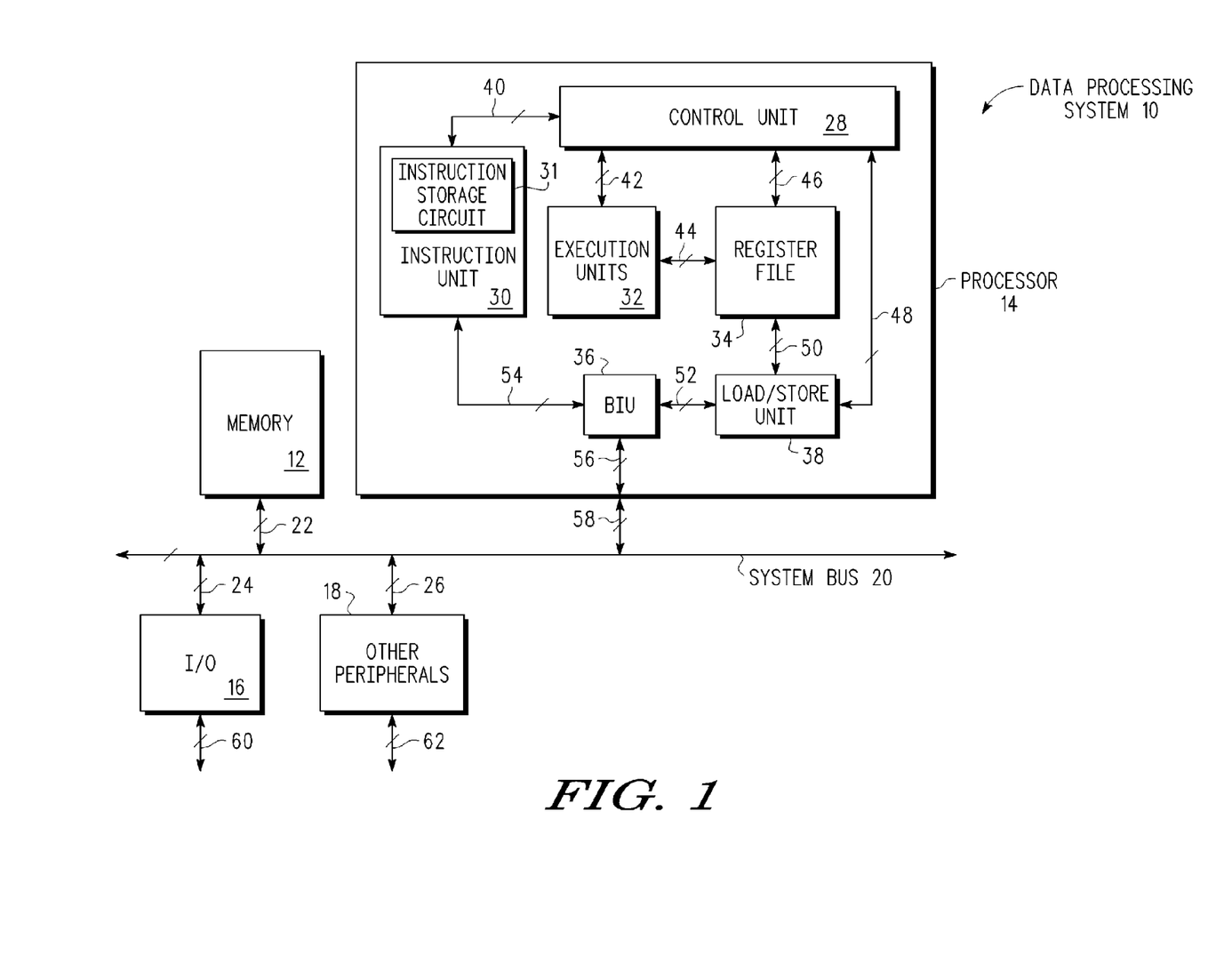
FIG. 1 illustrates a data processing system in accordance with one embodiment of the present invention.

FIG. 1 illustrates, in block diagram form, a data processing system 10 in accordance with one embodiment of the present invention. Data processing system 10 includes a processor 14, memory 12, input/output (I/O) 16, other peripherals 18, and a system bus 20. Memory 12 is bidirectionally coupled to system bus 20 via conductors 22, I/O 16 is bidirectionally coupled to system bus 20 via conductors 24, other peripherals 18 is bidirectionally coupled to system bus 20 via conductors 26, and processor 14 is bidirectionally coupled to system bus 20 via conductors 58. In one embodiment, other peripherals 18 may include one or more peripherals, where each can be any type of peripheral, such as a universal asynchronous receiver transmitter (UART), a real time clock (RTC), a keyboard controller, other memories, etc. Some or all of other peripherals 18 may be capable of communicating information external to data processing system 10 via conductors 62. I/O circuitry 16 may include any type of I/O circuitry which receives or provides information external to data processing system 10, via, for example, conductors 60. Memory 12 can be any type of memory, such as, for example, a read only memory (ROM), a random access memory (RAM), non-volatile memory (e.g. Flash), etc. Data processing system 10 may include other elements than those illustrated, or may include more or fewer elements than those illustrated. For example, data processing system 10 may include any number of memories or processors.

Processor 14 may be any type of processor, such as, for example, a microprocessor, microcontroller, digital signal processor, etc. In one embodiment, processor 14 may be referred to as a processor core. In another embodiment, processor 14 may be one of many processors in a multi-processor data processing system. Furthermore, although not illustrated as such, processor 14 may be a pipelined processor. In the embodiment illustrated in FIG. 1, processor 14 includes a control unit 28, an instruction unit 30, execution units 32, a scalar register file 34, a bus interface unit (BIU) 36, and a load/store unit 38. Control unit 28 is bidirectionally coupled to instruction unit 30 via conductors 40, to execution units 32 via conductors 42, to scalar register file 34 via conductors 46, and to load/store unit 38 via conductors 48. Execution units 32 are bidirectionally coupled to scalar register file 34 via conductors 44, and scalar register file 34 is bidirectionally couple to load/store unit 38 via conductors 50. BIU 36 is bidirectionally coupled to instruction unit 30 via conductors 54 and to load/store unit 38 via conductors 52. Processor 14 is capable of bidirectionally communicating with system bus 20 via conductors 56 which are coupled to conductors 58. Note that processor 14 may include more circuitry than that illustrated, where the additional circuitry may also be coupled to conductors 58. That is, conductors 56 may communicate with system bus 20 via all or a portion of conductors 58. Note also that all or a portion of processor 14 may be referred to as processing circuitry.

In operation, instruction unit 30 fetches instructions from a memory, such as memory 12, via BIU 36 and system bus 20, and receives and provides control information to and from control unit 28. Instruction unit 30 also includes an instruction storage circuit 31. This may include an instruction register which stores the next instruction to be decoded and executed. This may also include an instruction buffer which provides fetched instructions to the instruction register. Instruction unit 30 can be any type of instruction unit as known in the art with any type of instruction storage circuitry, and operates as known in the art, and therefore will not be described in more detail herein. Instruction unit 30 therefore provides instructions to control unit 28 which controls execution of these received instructions via, for example, executions units 32 and load/store unit 38, which are both capable of communicating with scalar register file 34, as needed, directly or via control unit 28. For example, control unit 28, via load/store unit 38 and BIU 36, is capable of loading data from memory (such as memory 12) to registers within scalar register file 34 as needed for executing instructions and is capable of storing data from registers within scalar register file 34 to memory (such as memory 12) as needed for executing instructions. For example, in one embodiment, load/store unit 38 can communicate directly with scalar register file 34 (to read and write data) via conductors 50 based on control information provided from control unit 28 via conductors 48. Execution units 32 can perform arithmetic, logical, shifting, or other operations using data stored within scalar register file 34 and store results to registers within scalar register file 34, as required for executing the instructions received from instruction unit 30 by way of control unit 28. Execution units 32 may include, for example, arithmetic logic units (ALUs), floating-point units, etc.

Scalar register file 34 includes N general purpose registers (GPRs), where N can be any integer greater than or equal to one. In one embodiment, scalar register file 34 includes 32 32-bit registers. As used here in, a scalar register indicates a register which has a one dimensional map and thus holds only one row of data (e.g. a 1 by M-bit register), where M can be any integer greater or equal to one. In one embodiment, M is 32, and each register is thus capable of storing a 32-bit quantity. Scalar register file 34 can provide or receive control information or data to or from control unit 28 via conductors 46.

Operation of processor 14 will not be described in more detail herein other than for those portions that are needed in understanding the various embodiments described herein.

Figure 2:
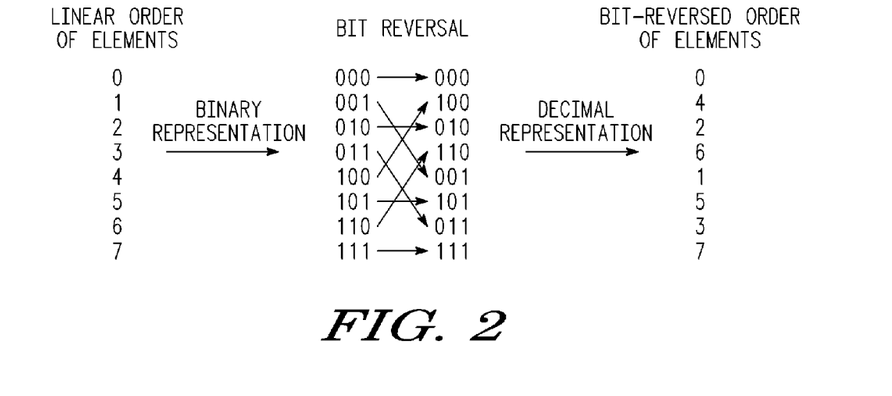
FIG. 2 illustrates an example of bit-reversed addressing.

FIG. 2 illustrates an example of bit-reversed addressing which may be used when accessing data elements in a bit-reversed manner, such as, for example, when accessing FFT data elements from a buffer stored in memory 12. In the example of FIG. 2, it is assumed that 8 data elements (elements 0-7) are stored in linear order. Each of these elements can be addressed by a 3-bit binary address representing the values 0 to 7. These binary values, %000, %001, %010, %011, %100, %101, %110, and %111, correspond to each of elements 0-7, respectively. These binary values are then "bit-reversed", resulting in the mirror image of each 3-bit binary value. Upon bit-reversing each of these binary values, the bit-reversed elements result in the elements 0-7 being addressed in the bit-reversed order of element 0, element 4, element 2, element 6, element 1, element 5, element 3, and element 7, respectively. Note that, for ease of explanation, the examples which will be described herein assume a buffer of 8 data elements to be accessed in a bit-reversed manner; however, alternate embodiments a buffer of any number of data elements can be addressed in a bit-reversed order.

Figure 3:
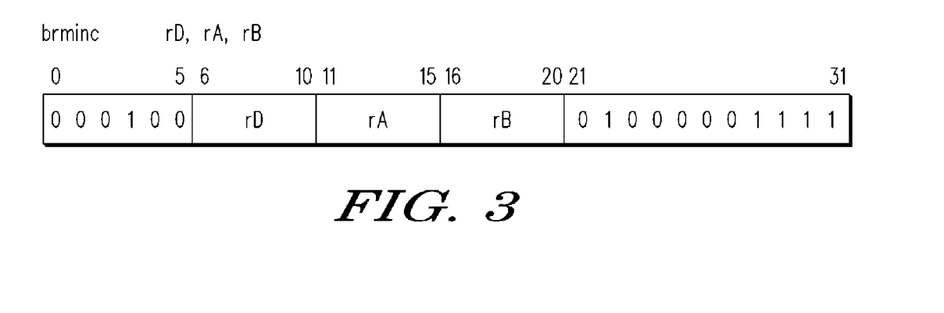
FIG. 3 illustrates a bit-reversed modulo increment instruction in accordance with one embodiment of the present invention.

FIG. 3, in accordance with one embodiment, illustrates a bit reversed modulo increment (brminc) instruction labeled "brminc rD, rA, rB". In the illustrated form the brminc instruction is a thirty-two bit instruction having predetermined fields. Other bit length instructions may be implemented and the bit size of each instruction field is implementation specific. An opcode and subopcode field identifies the function or type of instruction. Therefore the opcode and subopcode field of this instruction identifies the instruction as a brminc instruction. A brminc instruction provides a way for software to access FFT data (or any other type of data) in a bit-reversed manner modulo the data buffer size. A second field within the instruction is a destination register identifier labeled "rD" that identifies a register D. A third field within the instruction is a register identifier labeled "rA" that identifies a register A. A fourth field within the instruction is a register identifier labeled "rB" that identifies a register B. (As will be described in more detail below, the third field is a register selector field for selecting a register, rA, to providing an initial address value or initial pointer value, and the fourth field is a register selector field for selecting a register, rB, to provide a mask value or specifier.) It should be understood that in other embodiments additional fields or other fields may be implemented. Further, the ordering of the fields rD, rA and rB may be changed to other sequences than the one as illustrated in FIG. 3.

Figure 4:
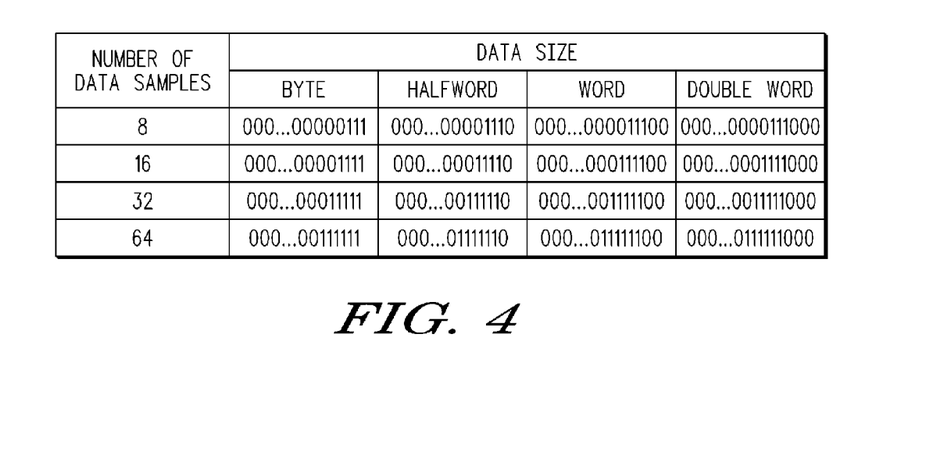
FIG. 4 illustrates a table of example values for masks for different data sizes and number of data which may be used for the bit-reversed modulo increment instruction of FIG. 3.

Still referring to the brminc instruction, the source register rA contains a pointer value (i.e. address value) into a buffer that contains data which is to be accessed in a bit-reversed order (e.g. a buffer that contains data on which FFT is to be performed). The destination register, upon execution of a brminc instruction, stores the next or subsequent bit-reversed pointer value (i.e. bit-reversed address value) identifying the next buffer element to be accessed such that the next element to be addressed provides a bit-reversed access order. The source register rB contains a bit-mask that allows a selected portion of the index to be updated with a bit-reversed increment of varying granularity. This bit-mask is based on a number of data elements or samples in a buffer (number of points in an FFT) as well as the data size of a sample. For example, FIG. 4 illustrates an example of a table which provides various bit-mask values based on both number of data samples and data sample size. To access a buffer containing n byte-sized data elements that is to be accessed with bit-reversed addressing, the mask has $\log_2$ n ones (1s) in the least significant bit positions and zeroes (0s) in the remaining most significant bit positions. If, however, the data size is a multiple of a halfword or a word, the mask is constructed so that the 1s are shifted left by $\log_2$ (size of the data in bytes) and 0s are placed in the least significant bit positions. As used herein, a word is defined as 4 bytes and a halfword is defined as 2 bytes. However, in alternate embodiments, a word can be defined differently, such as, for example, as 2 bytes or 8 bytes. Note that, for each row of the table, the bit-mask values, as they progress from the byte column to the doubleword column, are shifted to the left by one bit each time. Also, note that for each column of the table, the bit-mask values, as they progress from the size of 8 elements down to the size of 64 elements, have an additional lower order bit set to "1". The table of FIG. 4 can be expanded to include larger buffer sizes, which are typically powers of 2, and may include larger data sizes as well. The table of FIG. 4 may be stored within control unit 28 of FIG. 1, or may be stored elsewhere within system 10. The table of FIG. 4 may be stored as a table of values or may be implemented with logic gates. Alternate embodiments may store or receive the information of the table of FIG. 4 in a variety of different manners.

Figure 5:
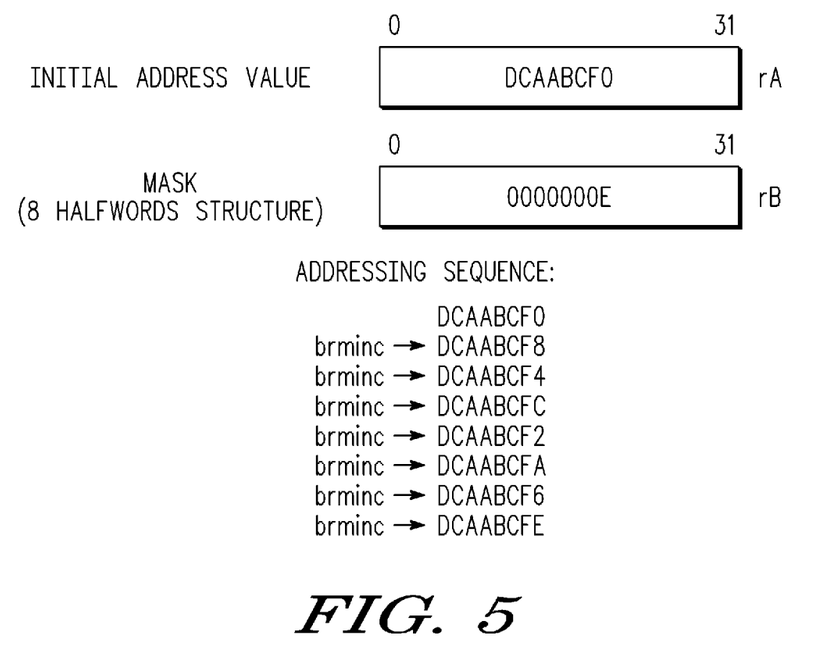
FIG. 5 illustrates, in diagram form, an example initial address pointer value, an example mask value, and an example bit-reversed addressing sequence in accordance with one embodiment of the present invention.
Figure 6:
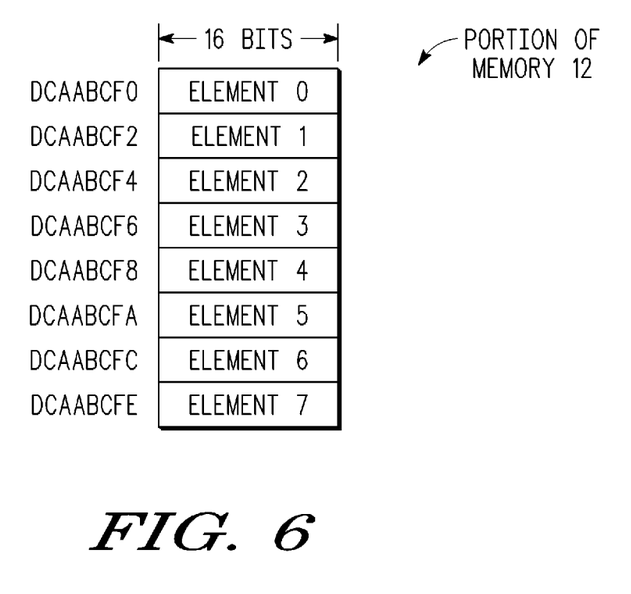
FIG. 6 illustrates, in diagram form, a portion of the memory of the data processing system of FIG. 1 storing data elements of an FFT buffer.

FIG. 5 illustrates a bit-reversed addressing sequence which may be achieved using the brminc instruction when accessing the example buffer of FIG. 6. In the example of FIG. 6, the buffer stores 8 data elements where each data element is a halfword in size. (Note that the buffer of FIG. 6 may be used in an FFT application, and may also be referred to as an FFT sample buffer. Note also that the buffer of FIG. 6 may be referred to as a data structure and can be formed within memory 12 prior to being accessed.) For example, FIG. 6 illustrates a portion of memory 12 which stores 8 halfword-sized data elements starting at address location 0xDCAABCF0. Since each element is a halfword in size (e.g. 16 bits), the next 7 elements, element 1-element 7, are sequentially addressed in linear order by address values 0xDCAABCF2, 0xDCAABCF4, 0xDCAABCF6, 0xDCAABCF8, 0xDCAABCFA, 0xDCAABCFC, and 0xDCAABCFE, respectively. (Note that each of these address values may also be referred to as pointer values.) If these were to be accessed in a bit-reversed order (as described in FIG. 2), then these addresses would be accessed in the following order: 0xDCAABCF0 (corresponding to element 0), 0xDCAABCF8 (corresponding to element 4), 0xDCAABCF4 (corresponding to element 2), 0xDCAAB-CFC (corresponding to element 6), 0xDCAABCF2 (corresponding to element 1), 0xDCAABCFA (corresponding to element 5), 0xDCAABCF6 (corresponding to element 3), and 0xDCAABCFE (corresponding to element 7).

Therefore, in the example of bit-reversed addressing in FIG. 5, an initial address value (i.e. initial pointer value) of 0xDCAABCF0 is placed into register rA, prior to execution of the brminc instruction, where this points to the first element, element 0, of the buffer in memory 12 to be accessed. Also, for this example, the mask value (taken from the table of FIG. 4) is "000 . . . 00001110," since the buffer contains 8 halfword-sized data elements. Therefore, referring to FIG. 5, this mask value is stored in rB prior to execution of the brminc instruction. (Note that, in one embodiment, the storage circuitry which includes rA and rB, such as register file 34, may be referred to as a first storage circuit within system 10 and the storage circuitry which stores the buffer, such as memory 12, may be referred to as a second storage circuit within system 10.) Referring to the addressing sequence of FIG. 5, upon executing a first brminc instruction using the initial address pointer stored in rA and the mask value in rB, the next address (i.e. next pointer value) in the bit-reversed addressing sequence, i.e. 0xDCAABCF8, is stored in rD. Prior to the next load or store instruction for accessing an element of the buffer in memory, the value of rA can be updated to this next address in the bit-reversed addressing sequence, i.e. 0xDDCAABCF8, which is now considered the initial address pointer or address value for generating the next address in the bit-reversed addressing sequence. Therefore, upon execution of the next (i.e. second) brminc instruction using the new initial address pointer stored in rA and the same mask value in rB, the next address in the bit-reversed addressing sequence, i.e. 0xDCAABCF4, is stored in rD. Note that rA and rD may refer to the same general purpose register (GPR) in scalar register file 34, such that each execution of a brminc instruction uses the previous value in rA and updates it to the next desired pointer value in sequence. Thus, by executing the second brminc instruction, the value of rA can be updated to this next address in the bit-reversed addressing sequence, i.e. 0xDCAABCF4. A load or store instruction without indexing can then be used to access the next sample of data in the buffer. Thereafter, upon executing the next (i.e. third) brminc instruction using the new initial address pointer stored in rA and the same mask value in rB, the next address in the bit-reversed addressing sequence, i.e. 0xDCAABCFC, is stored in rD. Thus, the value of rA can again be updated to this next address in the bit-reversed addressing sequence, i.e. 0xDCAABCFC by, for example, specifying the same GPR for rA and rD in the brminc instruction. Upon executing the next (i.e. fourth) brminc instruction using the new initial address pointer stored in rA and the same mask value in rB, the next address in the bit-reversed addressing sequence, i.e. 0xDCAABCF2, is stored in rD. Thus, the value of rA can again be updated to this next address in the bit-reversed addressing sequence, i.e. 0xDCAABCF2, by, for example, specifying the same GPR for rA and rD in the brminc instruction. Upon executing the next (i.e. fifth) brminc instruction using the new initial address pointer stored in rA and the same mask value in rB, the next address in the bit-reversed addressing sequence, i.e. 0xDCAABCFA, is stored in rD. Thus, the value of rA can again be updated to this next address in the bit-reversed addressing sequence, i.e. 0xDCAABCFA, by, for example, specifying the same GPR for rA and rD in the brminc instruction. Upon executing the next (i.e. sixth) brminc instruction using the new initial address pointer stored in rA and the same mask value in rB, the next address in the bit-reversed addressing sequence, i.e. 0xDCAABCF6, is stored in rD. Thus, the value of rA can again be updated to this next address in the bit-reversed addressing sequence, i.e. 0xDCAABCF6, by, for example, specifying the same GPR for rA and rD in the brminc instruction. Upon executing the next (i.e. seventh) brminc instruction using the new initial address pointer stored in rA and the same mask value in rB, the next address in the bit-reversed addressing sequence, i.e. 0xDCAABCFE, is stored in rD.

Therefore, through execution of the seven brminc instructions of FIG. 5, a bit-reversed addressing sequence for accessing the buffer (i.e. data structure) of FIG. 6 can be provided. In between each of these brminc instructions, additional instructions may be present which use the results in rD (i.e. the next address in the bit-reversed addressing sequence) in a subsequent data processing operation. For example, following each brminc instruction, a load or store instruction may be used to access the actual data stored at the location pointed to by the pointer value in rD. For example, after each brminc instruction, a halfword load without indexing instruction (e.g. an "lha" instruction) may be executed to obtain the data element. In one embodiment, this instruction may have the format "lha rD, 0(rA)". In this case, the "0(rA)" refers to the contents of the memory location addressed by the value stored in rA. (The "0" preceding the "(rA)" indicates that a 0 offset is to be added to the contents of rA prior to accessing the contents of memory location.) Therefore, the data element of the memory location (in, e.g., memory 12) addressed by the value stored in rA is stored in rD. For example, the first brminc instruction in FIG. 5 may be "brminc r2, r2, r4", where r2 holds the previous pointer value into the data structure and r4 holds the proper mask value determined by the number of elements stored in the buffer and the size of each data element. This first brminc instruction may be followed by "lha r8 0(r2)" as shown below to load the next data sample from the buffer (i.e. data structure) into GPR r8 in a bit-reversed fashion:

brminc r2, r2, r4
lha r8, 0(r2)

Store operations may use similar addressing modes, such that after each brminc instruction, a halfword store without indexing instruction (e.g. an "sth" instruction) may be executed to update the data element. In one embodiment, this instruction may have the format "sth rS, 0(rA)". In this case, the "0(rA)" refers to the contents of the memory location addressed by the value stored in rA. (The "0" preceding the "(rA)" indicates that a 0 offset is to be added to the contents of rA prior to accessing the contents of memory location.) Therefore, the data element of the memory location (in, e.g., memory 12) addressed by the value stored in rA is updated with the store data value stored in rS. For example, the first brminc instruction in FIG. 5 may be "brminc r2, r2, r4", where r2 holds the previous pointer value into the data structure and r4 holds the proper mask value determined by the number of elements stored in the buffer and the size of each data element. This first brminc instruction may be followed by "sth r8 0(r2)" as shown below to store the next data sample into the buffer (i.e. data structure) from GPR r8 in a bit-reversed fashion:

brminc r2, r2, r4
sth r8, 0(r2)

Therefore, since the above brminc ("brminc r2, r2, r4") is assumed to be the first brminc instruction in FIG. 5, prior to execution of the brminc instruction, the initial pointer value of 0xDCAABCF0 would be placed in r2, and, upon execution of this brminc instruction, r2 would be updated with the next pointer or address value of the next address in the bit-reversed sequence, i.e. 0xDCAABCF8. Note that in this example, the GPR used for rA is the same as the one used for rD. In this manner, less register locations are used. However, in alternate embodiments, different GPRs can be used for each of rA and rD. Note that the resulting value in r2 after execution of the brminc instruction is the address value itself of the next address in the bit-reversed sequence. Therefore, it may be used directly by the next load or store instruction without having to add any base value or offset to it, to access element 4 from 0xDCAABCF8. That is, it is not simply an index value which must then be added back to the buffer starting address, 0xDCAABCF0, to obtain the next data element addressed by the next bit-reversed address, as was the case with the brinc instruction. Therefore, note that the lha instruction does not require in index and base value as did the lhax instruction, thus requiring the use of one less GPR in executing the instruction. Operation of the brminc instruction will be further understood in reference to the examples of FIGS. 7 and 8. Note that in FIGS. 7-9, "~" indicates a bit-wise inverse operation, "&" indicates a bit-wise AND operation, "|" indicates a bit-wise OR operation, "bitrev" indicates a bit reverse operation, and "||" indicates a concatenate operation.

Figure 7:
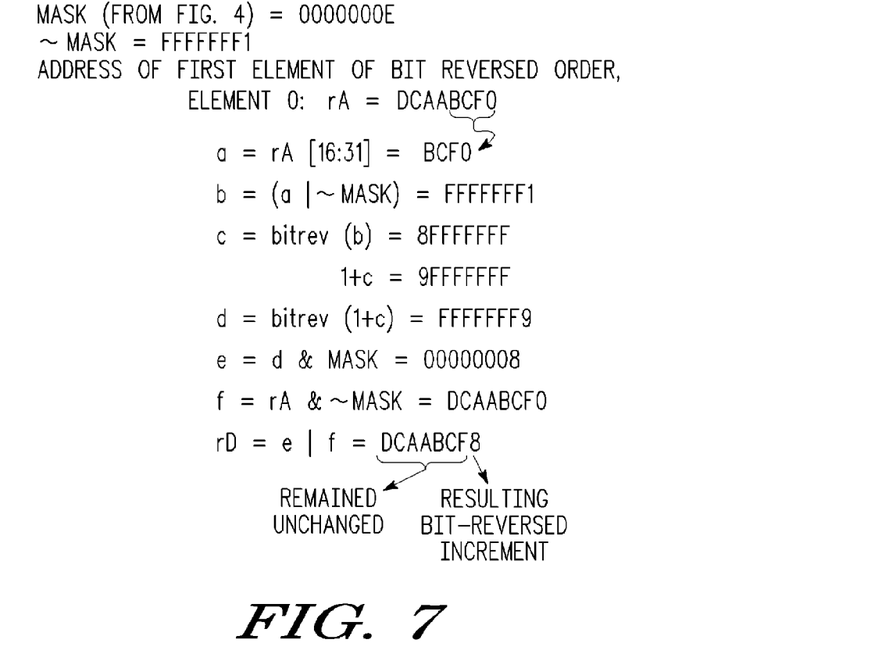
FIGS. 7 and 8 illustrate example operations performed during execution of a brminc instruction using the example FFT buffer of FIG. 6 in accordance with one embodiment of the present invention.

FIG. 7 illustrates the operations which occur upon execution of a brminc instruction, assuming an initial address value of 0xDCAABCF0 (the address of element 0) in rA and a mask of %000 . . . 00001110 (from FIG. 4) in rB. Note that the mask value (MASK) can be represented as the 32-bit value of 0x0000000E, which can correspond to a 16 bit mask value padded with 16 bits of zero so as to become a 32 bit value. Therefore, the bit-wise inverse value of the mask (~MASK) is 0xFFFFFFF1. Intermediate value "a" is set to bits 16-31 of rA (i.e. the least significant 16 bits of rA), which, in the current example, is 0xBCF0. Intermediate value "b" is "a|~MASK" which is 0xFFFFFFF1. Intermediate value "c" is "bitrev(b)" which indicates the bit-reversed value of "b". Since, as represented in binary, b=%1111 1111 1111 1111 1111 1111 1111 0001, the bit-reversed value of "b", represented in binary, is %1000 1111 1111 1111 1111 1111 1111 1111. This bit-reversed value of "b" represented in hexadecimal is therefore 0x8FFFFFFF. The value "1+c" is then 0x9FFFFFFF. Intermediate value "d" is "bitrev(1+c)". Therefore, "d" (i.e. the bit-reversed value of "1+c") is 0xFFFFFFF9. The intermediate value "e" is "d & MASK" (i.e. "0xFFFFFFF9 & 0x0000000E") which is 0x00000008. The intermediate value "f" is "rA & ~MASK" (i.e. "0xDCAABCF0 & 0xFFFFFFF1") which is 0xDCAABCF0. Therefore, note that the intermediate value "e" provides a resulting bit-reversed increment portion or value and the intermediate value "f" represents a portion of rA which remains unchanged. Therefore, the final operation provides the value of rD which is "e|f" which is 0xDCAABCF8 (which is the address of element 4). Therefore, only the least significant 4-bits of the initial pointer value in rA (0xDCAABCF0) was updated with a bit-reversed increment while the remaining higher order 28 bits of the initial pointer value in rA remained unchanged.

Due to the mask value of 0x0000000E, only the lower order 4-bits of the initial pointer value in rA is allowed to change and be updated with a bit-reversed increment. That is, the first transition in bit values (e.g. from 0 to 1) of the mask value starting from the highest order bit down towards the lower order bit defines the starting point of the lower order portion of the initial pointer value that is allowed to change, i.e. that is allowed to be updated with a bit-reversed increment. Therefore, since the binary representation of the mask value in this example is "%0000 0000 0000 0000 0000 0000 0000 1110," then the first time a bit transition occurs when starting at the most significant bit going and moving towards the least significant bit, is at the $4^{th}$ least significant bit location. Thus, the mask value can be described as supporting a modulo based increment with variable granularity by indicating which portion of the initial address value is allowed to be modified to implement a bit-reversed increment. The intermediate value "d" is therefore masked with MASK so as to isolate the resulting bit-reversed increment portion, where the intermediate value "e" represents the bit-reversed increment value. The ~MASK is then used with rA to isolate the portion of rA which remains unchanged.

In one embodiment, the mask value used to execute a brminc instruction may be referred to as a specifier that indicates both a first portion of a value and a second portion of the value, where the first portion of the value is identified to be modified by the processor and the second portion of the value is identified to remain unchanged. For example, still referring to the example of FIG. 7, the first portion may refer to the lower 4 significant bits of the initial address value (e.g. bits 28-31 as labeled in FIG. 5) which is modified by performing a bit-reversed increment and forming a modified first portion (e.g. represented by the intermediate value "e"), and the second portion may refer to the remaining 28 higher order bits of the initial address value (e.g. bits 0-27 as labeled in FIG. 5) which remains unchanged (e.g. represented by the intermediate value "f"). The modified first portion and the second portion can then be combined (e.g. by the "e|f" in the example of FIG. 7) to form an address which can be stored (e.g. in rD). As described above, another instruction (e.g. a load without index instruction) may then be received and decoded by processor 14 which accesses data located at this address value stored in rD which corresponds to an address location in memory 12. Therefore, the mask value (i.e. specifier) serves to vary the boundary between an unchanged portion and a modified portion of a bit reversed increment operation on a GPR.

Note that the mask value (i.e. specifier), as described above with respect to FIG. 4, is also a function of (or defines) a size of the one or more data elements of the buffer (which, in the current example of FIG. 7, is a halfword). Also, note that the boundary between the first portion that is allowed to change and the second portion that remains unchanged may be selectively varied by using different mask values (i.e. different specifiers), and that this boundary is a function of both a number of data samples as well as a data sample size. This boundary may be determined by detecting a logic value change between successive bit values of the logic value (e.g., the boundary may correspond to the first time a logic value occurs when starting at the most significant bit and progressing down towards the least significant bit, as described above with respect to the example of FIG. 7). In one embodiment, this boundary is selected by control unit 28, which may, for example, store or receive information representative of the table of FIG. 4. In one example, the boundary between the first and second portion may be a location that is not byte aligned for data in the first portion or the second portion. For example, the boundary in the example of FIG. 7 occurs between the $4^{th}$ least significant bit and the $5^{th}$ least significant bit, which is not byte aligned. In another example, the boundary may be selected such that the first portion of the value has an odd number of bits. For example, using a mask value of %000 . . . 00011110 from the table in FIG. 4, which corresponds to a buffer of 16 halfword elements, the boundary in the example of FIG. 7 would result in the first portion having 5 bits. In another example, the first portion may be either 7 or 9 bits.

Figure 8:
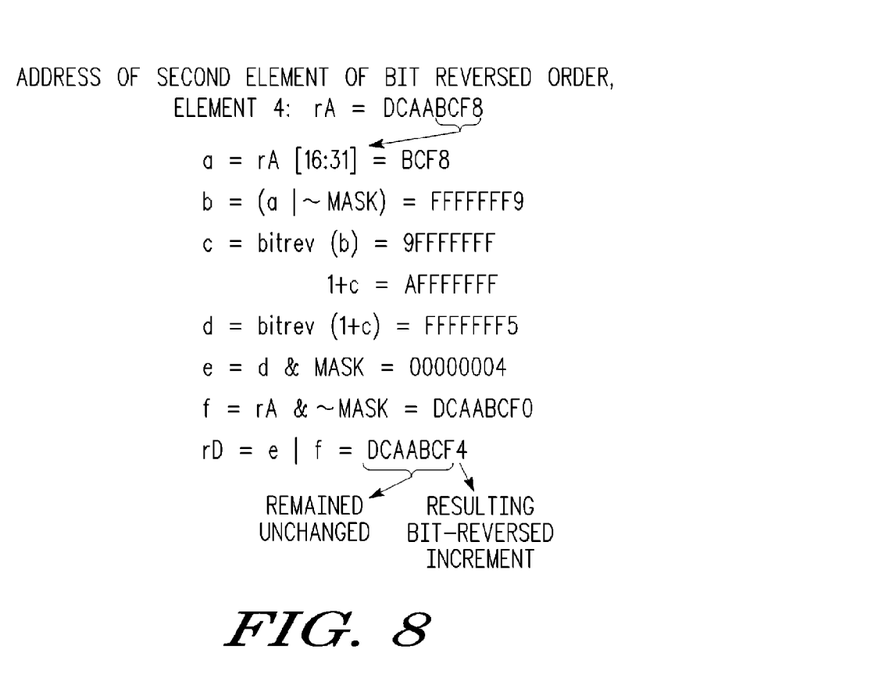

FIG. 8 illustrates the operations which occur upon execution of a brminc instruction, assuming an initial address value of 0xDCAABCF8 (the address of element 4) in rA and a mask of %000 . . . 00001110 (from FIG. 4) in rB. Note that the mask value (MASK) can be represented as the 32-bit value of 0x0000000E, which can correspond to a 16 bit mask value padded with 16 bits of zero so as to become a 32 bit value. Therefore, the bit-wise inverse value of the mask (~MASK) is 0xFFFFFFF1. Intermediate value "a" is set to bits 16-31 of rA (i.e. the least significant 16 bits of rA), which, in the current example, is 0xBCF8. Intermediate value "b" is "a|~MASK" which is 0xFFFFFFF1. Intermediate value "c" is "bitrev(b)" which indicates the bit-reversed value of "b". Since, as represented in binary, b=%1111 1111 1111 1111 1111 1111 1111 1001, the bit-reversed value of "b", represented in binary, is %1001 1111 1111 1111 1111 1111 1111 1111. This bit-reversed value of "b" represented in hexadecimal is therefore 0x9FFFFFFF. The value "1+c" is then 0xAFFFFFFF. Intermediate value "d" is "bitrev(1+c)". Therefore, "d" (i.e. the bit-reversed value of "1+c") is 0xFFFFFFF5. The intermediate value "e" is "d & MASK" (i.e. "0xFFFFFFF5 & 0x0000000E") which is 0x00000004. The intermediate value "f" is "rA & ~MASK" (i.e. "0xDCAABCF8 & 0xFFFFFFF1") which is 0xDCAABCF0. Therefore, note that the intermediate value "e" provides a resulting bit-reversed increment portion or value and the intermediate value "f" represents a portion of rA which remains unchanged. Therefore, the final operation provides the value of rD which is "e|f" which is 0xDCAABCF4 (the address of element 2). Therefore, again, only the least significant 4-bits of the initial pointer value in rA (0xDCAABCF0) was updated with a bit-reversed increment while the remaining higher order 28 bits of the initial pointer value in rA remained unchanged. As was described above in reference to FIG. 7, the mask value supports a modulo based increment of bit-variable granularity by indicating which portion of initial address value is allowed to be modified to implement a bit-reversed increment and which portion of the initial address value remains unchanged (i.e. indicates a first portion of a value to be modified and a second portion of the value which is to remain unchanged), where the intermediate value "e" represents the bit-reversed increment value (i.e. represents the modified first portion) and the intermediate value "f" represents the higher order portion which remains unchanged (i.e. the second portion).

Note that the operations illustrated in FIGS. 7 and 8 can be performed by a variety of different types of circuitry located, for example, in execution units 32 of processor 14. Also, different operations may be performed that those illustrated in FIGS. 7 and 8 to achieve the results shown in FIGS. 7 and 8.

Figure 9:
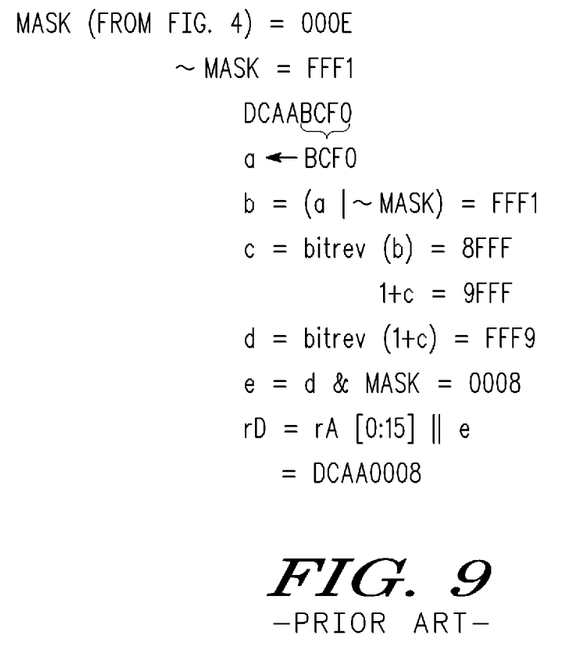
FIG. 9 illustrates operations performed during execution of a brinc instruction using the example FFT buffer in accordance with the prior art.

FIG. 9 illustrates the operations which occur upon execution of a prior art brinc instruction, also assuming an initial address value of 0xDCAABCF0 (the address of element 4) in rA and a mask of %000 . . . 00001110 in rB. Note that the mask value (MASK), in this example, is only represented as a 16-bit value, 0x000E. Therefore, the bit-wise inverse value of the mask (~MASK) is 0xFFF1. Intermediate value "a" is set to bits 16-31 of rA (i.e. the least significant 16 bits of rA), which, in the current example, is 0xBCF0. Intermediate value "b" is "a|~MASK" which is 0xFFF1. Intermediate value "c" is "bitrev(b)" which is 0x8FFF. The value "1+c" is then 0x9FFF. Intermediate value "d" is "bitrev(1+c)" which is 0xFFF9. The intermediate value "e" is "d & MASK" which is 0x0008. The final value in rD is then obtained by concatenating bits 16-31 of rA with intermediate value "e" (i.e. "0xDCAA||0x0008") which is 0xDCAA0008. Note that this value is not the correct address value of the next address in the bit-reversed addressing order. That is, after an initial address value of 0xDCAABCF0, the next address in the bit-reversed sequence should be 0xDCAABCF8 which addresses element 4, as was the result with the brminc operations described in FIG. 7. That is, the result of the brinc operations in FIG. 9 provides 0xDCAA0008 as the final result which does not address element 4 in memory 12. In order for the final concatenation ("rA[0:15]||e") to provide a useful value, the values of rA[0:15], prior to execution of the brinc instruction, need to be "0". In this case, rA, prior to execution of the brinc instruction, needs to refer to an index value into the buffer (a value between 0x0 and 0x7) rather than an actual pointer or address value, as described above in reference to the brminc instruction. In this manner, the result in rD of the brminc instruction is the index value of the next element to be accessed in a bit-reversed order. Therefore, in the example of FIG. 9, if the initial value in rA is set to the initial index value of 0x00000000, then the result in rD would be 0x00000008, which would correctly index the next element, element 4. However, this index value in rD could not then be used to directly address element 4. That is, as described above, either an additional instruction would be needed to add this index value to the base address value of the buffer (0xDCAABCF0) prior to being able to load element 4, or a load with index instruction (e.g. an Ihax instruction) has to be used which requires the use of an extra GPR as compared to the load without index (i.e. the Iha) instruction described above which can be used after a brminc instruction.

Therefore, the brinc instruction, unlike the brminc instruction, does not support a bit-variable granularity modulo based increment. Furthermore, the result of the brinc instruction, unlike the brminc instruction, does not provide the actual address value of the next element to be accessed. In this manner, the brminc instruction may allow for the use of less GPRs when access the elements of a buffer in a bit-reversed sequence. Therefore, by now it should be appreciated that the brminc instruction may allow for improved efficiency when accessing buffer elements in a bit-reversed sequence.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 12 may be located on a same integrated circuit as processor 14 or on a separate integrated circuit or located within another peripheral or slave discretely separate from other elements of system 10. Also for example, system 10 or portions thereof may be soft or code representations of physical circuitry or of logical representations convertible into physical circuitry. As such, system 10 or portions thereof may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 12 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text:

1. A method comprising:
    receiving a first instruction at an input of a processor and storing the first instruction in an instruction storage circuit;
    providing a specifier that indicates both a first portion of a value and a second portion of the value, the first portion of the value is identified to be modified by the processor and the second portion of the value is identified to remain unchanged;
    decoding the first instruction and in response to the decoding the processor modifying the first portion of the value by performing a bit-reversed increment to form a modified first portion;
    combining the modified first portion with the second portion of the value which remained unchanged to form a first address;
    storing the first address in a first storage circuit;
    receiving a second instruction at the input of the processor; and
    decoding the second instruction and in response to the decoding, the processor accessing data located at the first address which is assigned to a second storage circuit.

2. The method of statement 1 further comprising:
    forming a data structure in the second storage circuit; and
    determining a value of the specifier as a function of a number of data elements stored in the data structure in the second storage circuit.

3. The method of statement 2 further comprising:
    using the specifier to define a size of one or more of the data elements of the data structure.

4. The method of statement 1 further comprising:
    using a first portion of the second storage circuit as a Fast Fourier Transform (FFT) buffer for storing samples of FFT data.

5. The method of statement 1 further comprising:
    implementing the first storage circuit as a portion of a general purpose register file coupled to an execution unit in the processor.

6. The method of statement 1 further comprising:
    selectively varying a boundary between the first portion of the value and the second portion of the value.

7. The method of statement 6 further comprising:
    selecting the boundary to be a location that is not byte aligned for data in the first portion and the second portion.

8. The method of statement 6 further comprising:
    selecting the boundary to a position in which the first portion of the value has an odd number of bits.

9. The method of statement 8 further comprising:
    selecting the odd number of bits to be either seven bits or nine bits.

10. The method of statement 6 further comprising:
    using a binary value and detecting a logic value change between successive bit values of the binary value to determine the boundary between the first portion and the second portion of the value.

11. A data processing system having a processor for executing instructions and a memory for storing data, the processor executing a predetermined one of the instructions to form a new address by:
    receiving the predetermined one of the instructions at an input of the processor;
    storing a first address in an instruction storage circuit;
    providing a specifier that indicates both a first portion of a value and a second portion of the value, the first portion of the value is identified to be modified by the processor and the second portion of the value is identified to remain unchanged;
    decoding the predetermined one of the instructions and in response to the decoding, the processor modifying the first portion of the value by performing a bit-reversed increment to form a modified first portion;
    combining the modified first portion with the second portion of the value which remained unchanged to form a second address as the new address; and storing the second address in a first storage circuit, the processor using the second address when executing a subsequent instruction to access the memory.

12. The data processing system of statement 11 further comprising:
    forming a data structure in the memory; and
    determining a value of the specifier as a function of a number of data elements for the data structure stored in the memory.

13. The data processing system of statement 12 further comprising:
    using the specifier to define a size of one or more of the data elements of the data structure.

14. The data processing system of statement 11 further comprising:
    implementing a Fast Fourier Transform (FFT) buffer in the memory for storing samples of FFT data.

15. The data processing system of statement 11 further comprising:
    implementing the first storage circuit as a portion of a general purpose register file coupled to an execution unit in the processor.

16. The data processing system of statement 11 further comprising:
    selectively varying a boundary between the first portion and the second portion of the value.

17. The data processing system of statement 16 further comprising:
    using a binary value and detecting a logic value change between successive bit values of the logic value to determine the boundary between the first portion and the second portion of the value.

18. A data processing system comprising:
    a communication bus;
    a processor coupled to the communication bus, the processor executing a plurality of data processing instructions; and
    a memory coupled to the communication bus, the memory storing the plurality of data processing instructions wherein one of the plurality of data processing instructions functions to update a first pointer value, the one of the plurality of data processing instructions comprising:
        a register selector field for selecting a register to provide a specifier that indicates both a first portion of a value and a second portion of the value, the first portion of the value is identified to be modified by the processor and the second portion of the value is identified to remain unchanged;
    the processor further comprising:
        an execution unit for decoding the one of the plurality of data processing instructions and in response to the decoding, the processor modifying the first portion of the value by performing a bit-reversed increment to form a modified first portion, the execution unit combining the modified first portion with the second portion of the value which remained unchanged to form a second pointer value; and
        a register file coupled to the execution unit, the register file storing the second pointer value, the processor using the second pointer value when executing a subsequent instruction to access the memory.

19. The data processing system of statement 18 wherein the processor further comprises:
    a control unit coupled to the execution unit and the register file, the control unit selecting a boundary between the first portion of the value and the second portion of the value so that the first portion of the value has either seven or nine bits.

20. The data processing system of statement 18 wherein the memory further comprises:
    a data structure wherein a value of the specifier is a function of a number of data elements of the data structure in the memory.

What is claimed is:

1. A method comprising:
    receiving a first instruction at an input of a processor and storing the first instruction in an instruction storage circuit;
    providing a specifier that indicates both a first portion of a value and a second portion of the value, the first portion of the value is identified to be modified by the processor and the second portion of the value is identified to remain unchanged, wherein a first change in bit value from a first bit value to a second bit value in the specifier when the specifier is traversed from a highest order bit down towards a lowest order bit defines a boundary between the second portion and the first portion, wherein the specifier includes a same number of bits as the value and includes at least one higher order bit that has the first bit value;
    decoding the first instruction and in response to the decoding the processor modifying the first portion of the value by performing a bit-reversed increment to form a modified first portion, using all bits of the specifier to form a first intermediate value representative of the modified first portion, and using all bits of the specifier to form a second intermediate value representative of the second portion;
    combining the modified first portion with the second portion of the value which remained unchanged to form a first address, wherein the step of combining is performed such that a final operation used to form the first address is a bit-wise OR operation of the first intermediate value and the second intermediate value;
    storing the first address in a first storage circuit;
    receiving a second instruction at the input of the processor; and
    decoding the second instruction and in response to the decoding, the processor accessing data located at the first address which is assigned to a second storage circuit.

2. The method of claim 1 further comprising:
    forming a data structure in the second storage circuit; and
    determining a value of the specifier as a function of a number of data elements stored in the data structure in the second storage circuit.

3. The method of claim 2 further comprising:
    using the specifier to define a size of one or more of the data elements of the data structure.

4. The method of claim 1 further comprising:
    using a first portion of the second storage circuit as a Fast Fourier Transform (FFT) buffer for storing samples of FFT data.

5. The method of claim 1 further comprising:
    implementing the first storage circuit as a portion of a general purpose register file coupled to an execution unit in the processor.

6. The method of claim 1 further comprising:
    selectively varying the boundary between the first portion of the value and the second portion of the value.

7. The method of claim 6 further comprising:
selecting the boundary to be a location that is not byte aligned for data in the first portion and the second portion.

8. The method of claim 6 further comprising:
selecting the boundary to a position in which the first portion of the value has an odd number of bits.

9. The method of claim 8 further comprising:
selecting the odd number of bits to be either seven bits or nine bits.

10. The method of claim 6 further comprising:
using a binary value and detecting a logic value change between successive bit values of the binary value to determine the boundary between the first portion and the second portion of the value.

11. The method of claim 1, wherein the value is an address of a bit-reversed addressing sequence which directly addresses a location in the second storage circuit, and the first address formed by the step of combining is an immediately subsequent address to the address in the bit-reversed addressing sequence which directly addresses an immediately subsequent location in the second storage circuit in accordance with a bit-reversed order.

12. A data processing system having a processor for executing instructions and a memory for storing a plurality of elements to be accessed in a bit-reversed order, the processor executing a predetermined one of the instructions to form a new address by:
receiving the predetermined one of the instructions at an input of the processor;
storing a first address in an instruction storage circuit, wherein the first address is an address of a bit-reversed addressing sequence and directly addresses a first element of the plurality of elements;
providing a specifier that indicates both a first portion of the first address and a second portion of the first address, the first portion of the first address is identified to be modified by the processor and the second portion of the first address is identified to remain unchanged, wherein the specifier includes a same number of bits as the first address;
decoding the predetermined one of the instructions and in response to the decoding, the processor modifying the first portion of the first address by performing a bit-reversed increment to form a modified first portion, the processor using all bits of the specifier to form a first intermediate value representative of the modified first portion, and the processor using all bits of the specifier to form a second intermediate value representative of the second portion using all bits of the specifier;
combining the modified first portion with the second portion of the first address which remained unchanged to form a second address as the new address, wherein the step of combining is performed such that a final operation used to form the new address is a bit-wise OR operation of the first intermediate value and the second intermediate value, and wherein the second address is an immediately subsequent address to the first address in the bit-reversed addressing sequence and directly addresses an immediately subsequent element of the plurality of elements in accordance with the bit-reversed order; and
storing the second address in a first storage circuit, the processor using the second address when executing a subsequent instruction to access the memory.

13. The data processing system of claim 12 further comprising:
forming a data structure in the memory; and
determining a value of the specifier as a function of a number of data elements for the data structure stored in the memory.

14. The data processing system of claim 13 further comprising:
using the specifier to define a size of one or more of the data elements of the data structure.

15. The data processing system of claim 12 further comprising:
implementing a Fast Fourier Transform (FFT) buffer in the memory for storing samples of FFT data.

16. The data processing system of claim 12 further comprising:
implementing the first storage circuit as a portion of a general purpose register file coupled to an execution unit in the processor.

17. The data processing system of claim 12 further comprising:
selectively varying a boundary between the first portion and the second portion of the value.

18. The data processing system of claim 17 further comprising:
using a binary value and detecting a logic value change between successive bit values of the logic value to determine the boundary between the first portion and the second portion of the value.

19. The data processing system of claim 12, wherein a first change in bit value from a first bit value to a second bit value in the specifier when the specifier is traversed from a highest order bit down towards a lowest order bit defines a boundary between the second portion and the first portion.

20. The data processing system of claim 19, wherein the specifier includes a plurality of higher order bits that have the first bit value.

21. A data processing system comprising:
a communication bus;
a processor coupled to the communication bus, the processor executing a plurality of data processing instructions; and
a memory coupled to the communication bus, the memory storing the plurality of data processing instructions wherein one of the plurality of data processing instructions functions to update a first pointer value, the one of the plurality of data processing instructions comprising:
a register selector field for selecting a register to provide a specifier that indicates both a first portion of the first pointer value and a second portion of the first pointer value, the first portion of the first pointer value is identified to be modified by the processor and the second portion of the first pointer value is identified to remain unchanged, wherein a first change in bit value from a first bit value to a second bit value in the specifier when the specifier is traversed from a highest order bit down towards a lowest order bit defines a boundary between the second portion and the first portion, wherein the specifier includes a same number of bits as the first pointer value and includes at least one higher order bit that has the first bit value;
the processor further comprising:
an execution unit for decoding the one of the plurality of data processing instructions and in response to the decoding, the processor modifying the first portion of the value by performing a bit-reversed increment to form a modified first portion, using all bits of the specifier to form a first intermediate value representative of the modified first portion, and using all bits of the specifier to form a second intermediate value representative of the second portion using all bits of the specifier, and the execution unit combining the modified first portion with the second portion of the value which remained unchanged to form a second pointer value, wherein the combining is performed such that a final operation used to form the second pointer value is a bit-wise OR operation of the first intermediate value and the second intermediate value; and a register file coupled to the execution unit, the register file storing the second pointer value, the processor using the second pointer value when executing a subsequent instruction to access the memory.

22. The data processing system of claim 21 wherein the processor further comprises:

a control unit coupled to the execution unit and the register file, the control unit selecting a boundary between the first portion of the value and the second portion of the value so that the first portion of the value has either seven or nine bits.

23. The data processing system of claim 21 wherein the memory further comprises:

a data structure wherein a value of the specifier is a function of a number of data elements of the data structure in the memory.

24. The data processing system of claim 21, wherein the first pointer value is an address of a bit-reversed addressing sequence, and the second pointer value is an immediately subsequent address to the first pointer value of the bit-reversed addressing sequence, and wherein each of the first pointer value and second pointer value directly addresses an element stored in the memory being accessed in a bit-reversed order.

* * * * *